Patented Apr. 30, 1929.

1,711,281

UNITED STATES PATENT OFFICE.

HENRY M. MOWREY, OF TOLEDO, OHIO, ASSIGNOR TO THE UNITED CHICLE COMPANY, OF TOLEDO, OHIO, A CORPORATION OF OHIO.

PROCESS OF MAKING GUM.

No Drawing. Application filed May 13, 1927. Serial No. 191,279.

Numerous attempts have been made to embody yeast in chewing gum, but so far as I am aware, no successful attempt has been made. Ordinarily, chewing gum is made in a single kettle which is steam jacketed to maintain the binder in a plastic condition, and in the attempt heretofore to embody yeast in the gum, yeast has been placed in the heated kettle with the result that the yeast coming into contact with the sweet syrup and other ingredients, immediately commences fermentation, thereby rendering such method decidedly impractical.

An object of this invention is to produce a new and improved method for embodying yeast in chewing gum, and to overcome the objections heretofore existing in the production on a commercial scale of yeast chewing gum. Other objects and advantages will hereinafter appear.

In carrying out my process, I first make a tacky binder in the usual manner by placing the ingredients, which may be rubber, chicle or other suitable substance in a kettle to provide a plastic mass.

In a separate cool kettle or recpetacle, I place a quantity of powdered sugar, and after the binder has been heated and worked to the desired degree, this is poured in the cool kettle and thoroughly mixed with the powdered sugar by any suitable mixing apparatus. Although the tacky binder is of relatively high temperature, the kettle is cool or unheated so that in mixing the powdered sugar with the binder, it remains unmelted, and in this State is thoroughly distributed throughout the mass.

After the tacky binder and sugar have been satisfactorily mixed together, I add a quantity of pure yeast in powder form, and this is thoroughly mixed with the mass. In view of the fact that the sugar distributed throughout the batch is unmelted and in its powdery form, the contacting therewith of the yeast particles does not incite fermentation. In this step only a small proportion of the entire amount of yeast is added, and empirically I find that 20% of the total required amount of yeast should be added. If too great a quantity of yeast is added at one time, the plastic mass must necessarily be stirred or agitated to such an extent that the base or binder would tend to harden or solidify.

Afterwards the flavoring material is stirred into the batch and the material ordinarily used for this purpose is an extremely volatil liquid. Therefore, as soon as this liquid is mixed into the mass, a sweet liquid, such as corn syrup or glucose, is mixed in. The sweet syrup must be poured in immediately after the flavoring substance in order to prevent the access of air to the volatil flavoring substance to prevent evaporation. It is to be understood that the use of a volatil flavoring liquid has been found satisfactory for the purpose, but this is given by way of illustration and not of limitation.

When the sweet syrup has been thoroughly mixed into the mass, an additional amount of powdered yeast is added, this amount being 20% of the required volume of yeast, and when this quantity has been adequately mixed with the other ingredients, 20% additional powdered yeast is added. As above explained, if a greater quantity of powdered yeast were added at a single time it would be necessary to so mix or agitate the mass that the tacky binder or rubber-like base would tend to harden.

To provide additional mass and to enable the ingredients more readily to assimilate, previously prepared scraps of gum containing the soluble materials is added. Ordinarily, I take a quantity of scrap gum, such as the irregular edges and ends of gum which has previously gone through the process. This cold gum tends to cool the mass and give additional body thereto.

Subsequently, to the addition of scrap gum and after that material has been thoroughly mixed, 20% more powdered yeast is added, and after being properly distributed throughout the batch and just before the entire mass is finished, another quantity of powdered yeast of 20% of the required amount is added.

In order to release the batch from the walls of the kettle or receptacle, heat is applied thereto, and the batch kneaded and placed in a neutralizing oven in accordance with the usual practice. The gum may then be rolled and cut in any suitable manner.

While in the above description 20% of the entire amount of yeast is added to the mass at intervals, it is to be understood that this proportion may be slightly varied without sacrificing beneficial results. It is further to be understood that the word "powdery" used throughout the specification is intended to cover sugar and yeast in small or minute particles, as distinguished from lumpy material. Furthermore, as an additional auxiliary binder, other substances than scrap gum may be employed to advantage without departing from the spirit of my invention. Other changes in details of my process may be effected without departing from the spirit of the invention, especially as defined in the appended claims.

What I claim as new and desire to secure by Letters Patent is:

1. The hereindescribed process of making chewing gum, which resides in mixing a tacky binder and powdered sugar at such temperature that the sugar remains in its solid form, and then in adding powdered yeast at intervals in equal quantities of approximately 20% of the entire amount.

2. The hereindescribed process of making chewing gum, which resides in mixing a tacky binder and powdered sugar and then in adding powdered yeast and mixing same with the mass, the binder and sugar being mixed at such temperature that the sugar remains in its solid form thereby to prevent fermentation upon contact with the yeast.

In testimony whereof I have hereunto signed my name to this specification.

HENRY M. MOWREY.